United States Patent [19]
Kwiatkowski et al.

[11] 3,969,703
[45] July 13, 1976

[54] PROGRAMMABLE AUTOMATIC CONTROLLER

[75] Inventors: Jerome A. Kwiatkowski; Charles L. Wood, both of Muncie, Ind.

[73] Assignee: Ball Corporation, Muncie, Ind.

[22] Filed: Oct. 19, 1973

[21] Appl. No.: 408,208

[52] U.S. Cl. .................. 340/172.5; 235/151.11
[51] Int. Cl.[2] ................ G05B 1/08; G05B 11/18; G06F 3/05; G06F 15/46
[58] Field of Search ............... 340/172.5; 445/1; 235/151.11

[56] References Cited
UNITED STATES PATENTS

| | | | |
|---|---|---|---|
| 1,911,119 | 6/1933 | Ingle | 65/219 |
| 2,998,195 | 8/1961 | Kahn | 236/15 |
| 3,303,474 | 2/1967 | Moore et al. | 340/172.5 |
| 3,363,234 | 1/1968 | Erickson et al. | 340/172.5 |
| 3,426,331 | 2/1969 | Joyce | 340/172.5 |
| 3,465,298 | 8/1969 | LaDuke | 340/172.5 |
| 3,534,143 | 10/1970 | Charleson et al. | 13/1 |
| 3,559,188 | 1/1971 | Proctor | 235/151.11 X |
| 3,576,540 | 4/1971 | Fair et al. | 340/172.5 |
| 3,581,289 | 5/1971 | Wilhelm et al. | 340/172.5 |
| 3,585,603 | 6/1971 | Ross et al. | 340/172.5 |
| 3,600,149 | 8/1971 | Chen et al. | 65/162 |
| 3,622,990 | 11/1971 | Lerch et al. | 340/147 R |
| 3,634,660 | 1/1972 | Moran et al. | 235/151.1 |
| 3,666,965 | 5/1972 | Luenser | 340/147 M T |
| 3,668,653 | 6/1972 | Fair et al. | 340/172.5 |
| 3,678,464 | 7/1972 | Peters | 340/172.5 |
| 3,686,632 | 8/1972 | Olcelli et al. | 340/147 R |
| 3,693,163 | 9/1972 | Johnson et al. | 340/172.5 |
| 3,706,072 | 12/1972 | Greenley et al. | 340/147 P |
| 3,719,925 | 3/1973 | Uinch | 340/147 P |
| 3,720,814 | 3/1973 | Klien | 235/151.11 |
| 3,723,975 | 3/1973 | Kurtz, Sr. et al. | 340/172.5 |
| 3,731,280 | 5/1973 | Shevlin | 340/172;5 |
| 3,741,246 | 6/1973 | Braytenbah | 340/172.5 |
| 3,753,243 | 8/1973 | Ricketts, Jr. | 340/172.5 |
| 3,762,907 | 10/1973 | Quinn et al. | 65/164 |
| 3,771,136 | 11/1973 | Heneghan et al. | 340/172.5 |
| 3,771,144 | 11/1973 | Belady et al. | 340/172.5 |
| 3,793,511 | 2/1974 | Bala et al. | 235/151.11 |
| 3,793,625 | 2/1974 | Pomella et al. | 340/172.5 |
| 3,825,900 | 7/1974 | Anderson | 340/172.5 |

OTHER PUBLICATIONS

Norman Poisson, COMPUTER-LIKE CONTROLLERS, pp. 41–45, pub. Automation, Feb., 1971.
J. D. Langhans, THE PROGRAMMABLE CONTROLLER IN A CONTINUOUS PROCES, pp. 64–67, pub. Process, Eng., July, 1972.

*Primary Examiner*—Gareth D. Shaw
*Assistant Examiner*—Jan E. Rhoads
*Attorney, Agent, or Firm*—James D. Haynes

[57] ABSTRACT

A programmable automatic controller for operating machines having a plurality of components which operate in a timed or sequential relationship with one another. The controller includes a timing means for generating cycle clock pulses in synchronism with the operation of the machine, wherein the cycle clock pulses provide an instantaneous indication of the time elapsed in each cycle of operation of the machine. A COS/MOS running storage means stores the relative times during each cycle of machine operation when each of the plurality of machine components are to be enabled and/or inhibited. When the time elapsed in a cycle corresponds to a component actuating time stored in the running storage, an actuating signal is generated by a comparator. This signal is coupled to a machine component addressing arrangement which provides a component enable or inhibit command signal to the addressed component whose actuating time compared to the cycle time lapsed. Accordingly, in a cycle of operation a plurality of component operating command signals are generated which command the respective machine components to initiate and terminate operation at preselected time intervals.

An up-down counter is provided for selectively varying the component machine actuating times stored in the running storage means while the machine is in operation. In addition, means are provided for initiating a machine starting or stopping sequence at any time during the machine cycle. The machine starting and stopping sequences are predetermined and can be varied at any time before the operation of the machine.

22 Claims, 10 Drawing Figures

PROGRAMMABLE AUTOMATIC CONTROLLER

BACKGROUND OF THE INVENTION

This invention relates to a programmable automatic controller for operating one or more machines having a plurality of functional components which operate in a timed relationship with one another.

In the past there has been a great need for a programmable controller for operating complex machines having components which operate in timed relationship with one another. For example, in the glass forming technology, glass forming machines are typically comprised of a plurality of individual sections which are integrated into a single plural section machine fed by a single source of molten glass. The sections are operated in synchronism in such relative phase relationship as to permit the several sections to acquire gobs in ordered sequence from a single gob feeding means. Thus, as one of the sections is taking a gob from the feeding means, another section is delivering a finished article to an output conveyor and the other intermediate sections are engaged in various forming steps intermediate the taking of a gob in the production of the finished ware.

Further, it has been customary in the past to provide two molds in each section of an individual section machine whereby a gob is received in a first mold called the blank or parison mold for the initial process of forming a parison, followed by a transfer of the parison to a second mold called the blow mold for final blowing of the article. By this means each section of the machine is operating simultaneously upon two workpieces. In order to control the operation of the various functional components of the glass forming machine, a means must be provided for actuating each of the elements in a preselected cyclic time format so that the operation of one element does not interfere with, but rather complements, the operation of the other components.

The several functional elements of the glass forming stations in the individual section machine are typically driven by pneumatic pressure which is controlled by either a mechanical synchronizing means in the form of rotary drums or by an electronic timing circuit. An example of a prior art controller utilizing mechanical synchronizing means is disclosed in Ingle U.S. Pat. No. 1,911,119. The Ingle glass forming machine is cumbersome and more importantly is difficult to adjust so that the timing of the operation of the various components of the machine can be varied. An example of a prior art controller utilizing electronic timing circuits is U.S. Pat. No. 3,762,907 issued to Richard M. Quinn et al and assigned to the common assignee herewith. Some prior art controllers do not include an easy, simplified means for adjusting the time of operation of the various elements in a machine cycle while the machine is operating and accordingly lacks the flexibility desired in an automatic controller. A further drawback of the prior art has been the fact that no means has been provided for initiating a starting or stopping sequence of the machinery when the machine is to be started or stopped, respectively. For example, in stopping a section of a glass forming machine it is highly desirable to clear the last bottle, to have the transfer arm in the inverted position and the neck rings open. To properly accomplish this in an ordered sequence, the stop cycle should begin with the molds open. In the past, no such provision was made for initiating the stop cycle of a machine at a predesignated interval in the machine cycle and for effecting a predetermined operation of the components of the machine such that the shutting down of the machine occurs in a safe and orderly fashion.

A further drawback of the prior art is the fact that control systems have typically been designed to control the operation of a specific machine, such as for example, a glass forming machine, a molding machine, welding machines, etc. There is accordingly a need for a flexible automatic controller which can be easily programmed to control a plurality of different types of machines which operate on a cyclic or timed relationship.

It therefore is an object of this invention to provide a flexible, programmable automatic controller for operating machines of various types.

It is another object of this invention to provide an automatic controller having a simplified and efficient means for adjusting the timing of the operational functions of a machine with a high degree of accuracy while the machine is running.

It is yet another object of this invention to provide a programmable automatic controller for controlling a plurality of machines which operate in a predetermined, interdependent timed relationship with respect to one another.

SHORT STATEMENT OF THE INVENTION

Accordingly, this invention relates to a programmable automatic controller for operating machines having a plurality of functional components which operate in a timed relationship with respect to one another. More specifically, the automatic controller includes a pulse generator which generates machine cycle clock pulses in synchronism with the operation of a machine being controlled wherein the cycle clock pulses provide an instantaneous indication of the time elapsed in each cycle of operation of the machine. A running storage in the form of COS/MOS shift registers store the relative times in the machine cycle when each of the plurality of components of the machine is to be actuated. A comparator compares the output of the pulse generator, which indicates the time elapsed in the cycle, with the stored values in the running storage. When a comparison is made, an actuating signal is generated indicating that the functioning of a machine component is to be either started or stopped. To determine which machine component is to be actuated, an addressing means is provided which, when enabled by the output of the comparator, selects the particular component which is to be actuated at that point in time in the machine cycle. The addressing means then provides a component operating command to the appropriate component to either initiate operation of the component or to stop its operation.

It is often desirable in controlling the operation of a machine to vary the time at which a particular machine element is to be actuated. Accordingly, an up-down counter is provided which can be appropriately stepped during a machine operation to feed into the running storage a new component actuating time. In addition to being able to control the time in a cycle during which the various components are actuated, a means is provided for initiating a starting or stopping sequence at any time during a machine cycle, wherein once a starting or stopping sequence is initiated, the machine is controlled according to a preselected starting or stopping cycle so that the machine can be safely and efficiently turned on or shut down.

Finally, the invention includes a means for controlling a plurality of machines wherein each of the machines operates in a predetermined, interdependent timed relationship with respect to one another. Thus, for example, six machines may each receive input material to be operated on from a single source. Accordingly, the controller of the present invention includes means for sequentially coupling the input material to each of the machines in a preselected order and to stagger the machine cycles of each of the machines in accordance with the order in which input material is fed thereto.

BRIEF DESCRIPTION OF THE DRAWINGS

Other objects, features and advantages of the present invention will become more fully apparent from the following detailed description, the appended claims and the accompanying drawings, in which:

DETAILED DESCRIPTION OF THE PREFERRED EMBODIMENT

Figure 1:
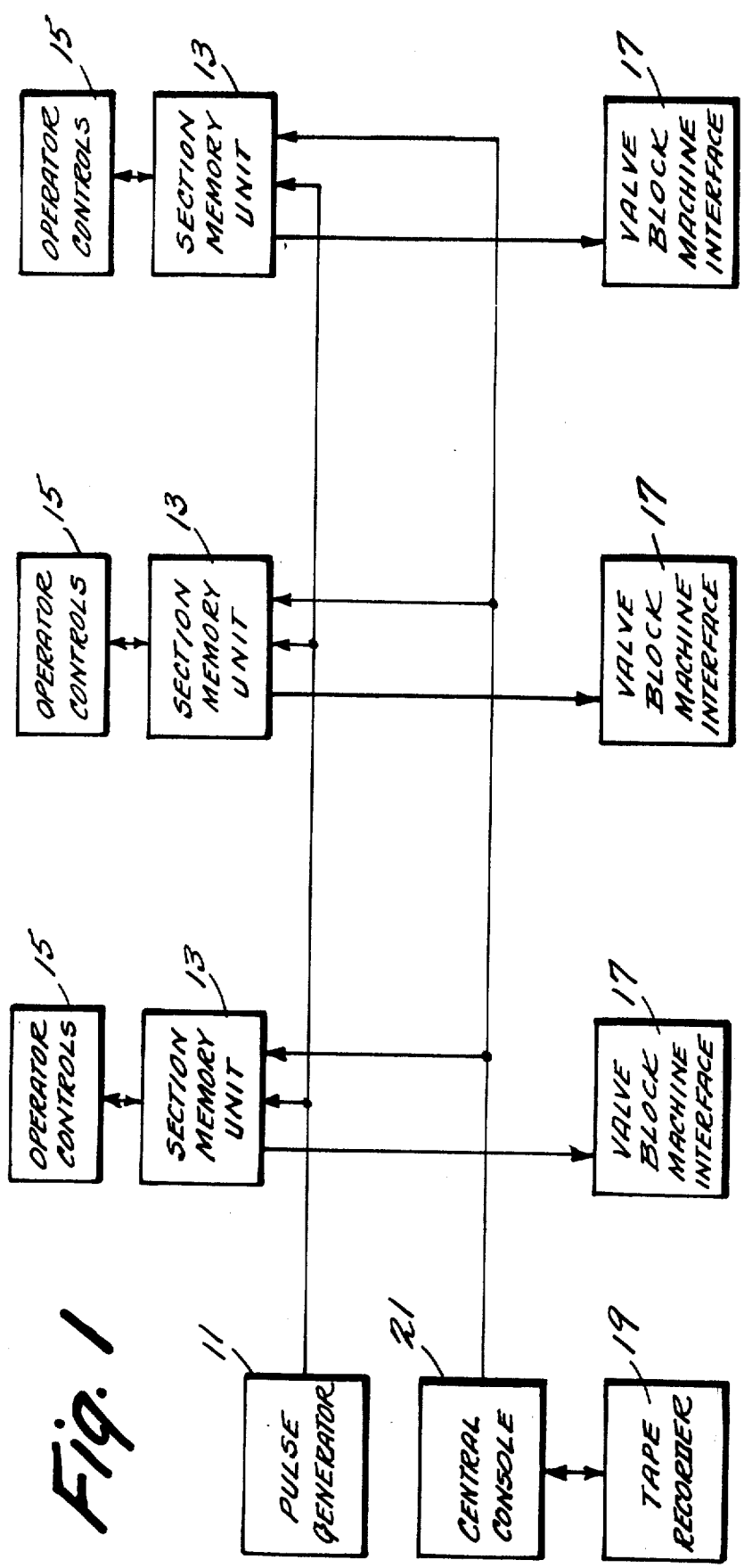
FIG. 1 is a block diagram of the programmable automatic controller of the present invention.

Refer now to FIG. 1 where there is shown a block diagram of the programmable automatic controller of the present invention. A pulse generator 11 provides a train of cycle clock pulses having an upper frequency level which is dictated by the cycle time of the memory units of the controller system. The generator also provides a reset pulse at the completion of each machine cycle and accordingly the frequency of the reset pulse is determined by the type of machine being controlled. The pulse generator may operate on a time base in which case the machine cycle is divided up into a convenient number of clock pulse intervals, or the generator may operate on a machine cycle base in which case 360 clock pulse intervals are provided per cycle. In the preferred embodiment when, for example, the automatic controller is controlling the operation of a glass forming machine, the pulse generator includes a suitable conventional pulse generating means mounted on the drive shaft of the glass forming machine and generates two pulse trains. The first pulse train provides a cycle clock pulse for every degree of machine rotation and the second pulse train provides one pulse per machine revolution. Thus, assuming that the machine to be controlled operates through a predetermined cycle, one pulse is generated at the beginning of the machine cycle and another pulse generated every 1/360th of a machine cycle.

The output of a pulse generator is coupled to each of a plurality of individual machine section memory units 13. Each section memory unit includes storage, comparing and addressing circuits which when arranged as described hereinbelow determines which elements of the machine being controlled are to be actuated at any given time. In addition, each section memory unit includes an up-down counter for changing the relative time in a machine cycle when selected machine components are to be actuated.

The operator control 15 includes start and stop push-buttons for initiating a sequence of machine control commands for starting up or shutting down the machine being controlled. In addition, the operator controls include a degree display for instantaneously displaying the cycle time elapsed for a particular machine being operated. Finally, the operator controls include "sooner" and "later" push-buttons for controlling the up-down counter in the section memory unit 13 and a function select control for designating which operational element is having its timing changed by the up-down counter. The operator controls are preferably positioned near the machine being controlled so that the operation of the machine can be monitored while the various control functions in the operator controls are being changed.

The output of each of the section memory units 13 is coupled to an associated valve block machine interface 17 which provides the mechanical drive means for the machine being controlled. If, for example, the machine being controlled is operated on a pneumatic basis, the valve block interface might include a number of valves which are controlled by solenoid actuators, the solenoid actuators being in turn controlled by the output of the section memory unit. A detailed description of the valve block machine interface will not be presented herein because actuators and valves for operating machine elements are known in the art and because of the applicability of the control system of the present invention to a number of different machines each having a different valve block machine interface structure.

A tape recorder 19 is provided which stores operational commands generated by a decimal keyboard. Thus, if the machines being controlled are to be operated in a number of different modes, each particular program mode may be stored on tape until it is utilized. The output of the tape is coupled to a central console 21 which synchronizes the machines being controlled via the section memory units so that if a plurality of machines are to be operated in a preselected time relationship with respect to one another, the central console insures that each of the section memory units are appropriately timed to operate in the preselected sequence. Further, the timing sequence in which the various components of the individual machines are to be operated is coupled from the central console to each of the associated memory units. In addition, as each of the individual sections are operated under the control of their associated section memory units 13, the section memory unit provides an output to the central console verifying the order in which the respective components of the machine are actuated. This information may be stored in the tape recorder for future use.

Figure 2:
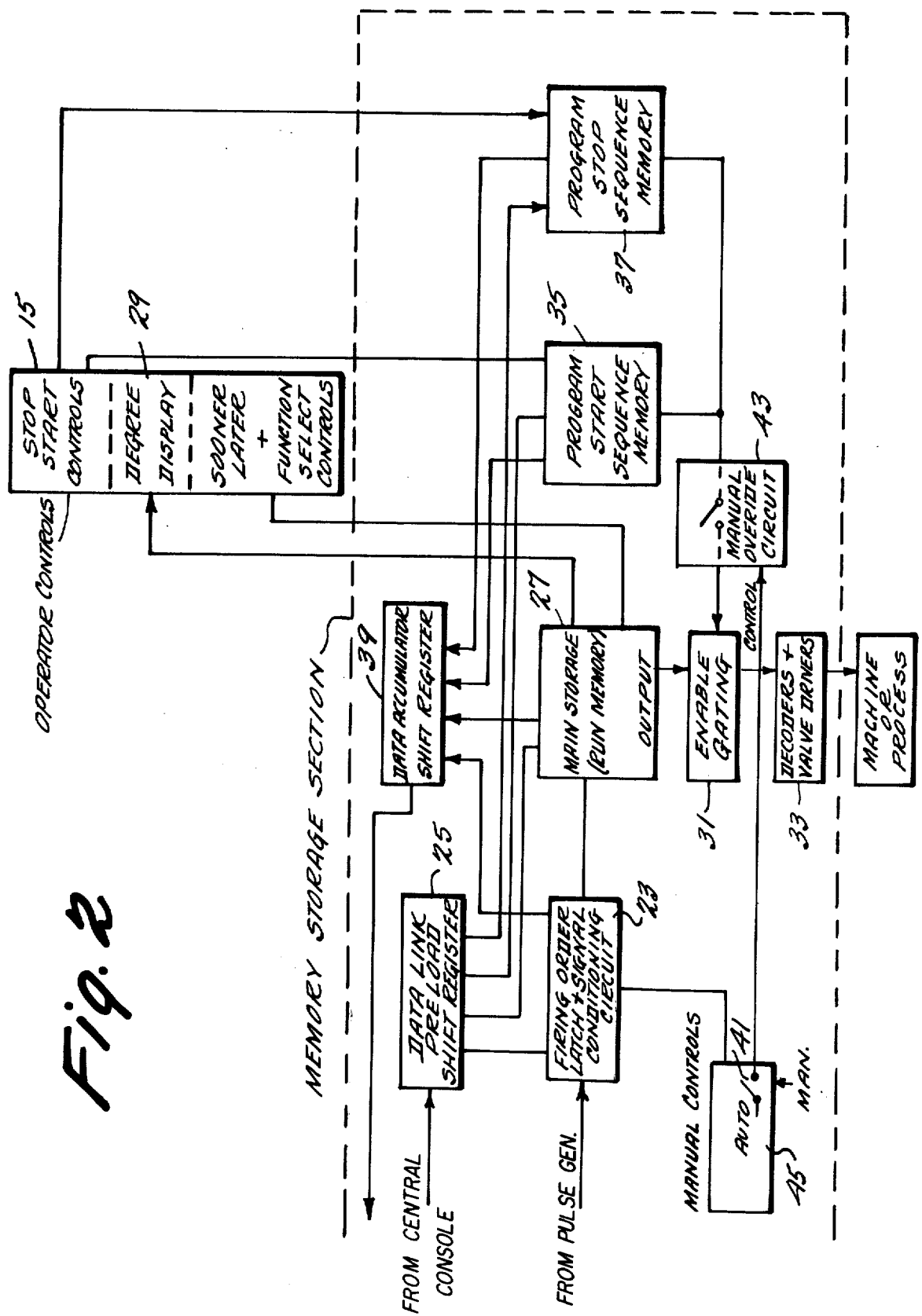
FIG. 2 is a more detailed functional block diagram of the memory storage and operator control sections of the programmable automatic controller for an individual machine.

Refer now to FIG. 2 with respect to which a more detailed description will be given of the section memory unit 13 and the operator controls 15. The output of the pulse generator 11 is coupled to the firing order latch and signal conditioning circuit 23. The conditioning circuit includes a manual switch for inverting the clock or the reset signals coming from the pulse generator. The reason for inverting the cycle clock or reset signals is that the leading edge of the cycle clock pulse train and the leading edge of the reset pulse must not be aligned so that the system can distinguish between the two signal trains. The firing order latch circuit controls the cycle timing of the individual machine being controlled. Thus, for example, in a glass forming machine which includes several individual sections, all sections are fed from a single feeder and deliver ware to the same conveyor system. The firing order circuits synchronize the section feeder and delivery mechanisms of each of the individual sections so that, for example, a first individual section machine receives input material from a feeder, then in turn a second machine sequentially receives input material, and so on. Thus, the firing order latch circuit in essence synchronizes the operation of a plurality of machines with respect to one another. The firing order latch circuit is controlled by means of a signal derived from a data link preload shift register 25. The input to the preload shift register is derived from the central console 21 and temporarily stores a timing command signal which instructs the firing order latch circuit 23 when to couple a reset pulse signal to the main storage memory unit 27. The clock pulse signals are coupled from the signal conditioning circuit to a comparator in the main storage unit 27 wherein the clock pulses which represent the time elapsed in a machine cycle are compared with component actuating times stored in a COS/MOS shift register arrangement. The component actuating times stored in the COS/MOS shift register storage in the main storage 27 are coupled thereto via the data link preload shift register 25 which in turn derives the timing input information from the central console 21. The particular times at which the machine elements are to be actuated may be varied by the operator by appropriately pressing a sooner or later button in the operator control console 15. Thus, during the operation of the machine, by appropriately pushing either the sooner or the later button together with a function select control which selects the machine component whose cycle operating time is being changed, the manner of operating the machine can be readily varied. The main storage also provides function degree display 29 in the operator control 15 whch degree display is the stored number of the selected function.

When a comparison is made in the main storage unit between the clock pulse timing input ande the stored component actuating time signals, an output is provided to the enable gating circuit 31. The enable gating circuit 31 provides an energizing signal to the decoder and valve driver circuit 33. The decoder circuit selects which component is to be actuated and hence which valve drive is to be energized. When the appropriate valve driver is energized, the associated machine component is actuated by either initiating or terminating its operation.

If the machine is initially shut down and it is desired to start up the machine, an appropriate starting signal is coupled to the program start sequence memory from the startstop control switches in the operator control 15. The particular starting sequence program is coupled to the start sequence memory 35 via the data link shift register 25 which in turn receives its input information from the central console 21. Thus, by appropriately typing into a storage circuit in the central console a preselected starting sequence, the sequence is coupled to the start sequence memory unit 35 which memory unit is actuated when the start button in the control 15 is pressed. The output of the start memory sequence is coupled to the enable gating circuit 31 which in turn couples this signal to the decoder and valve driver circuit 33 for operating in a preselected manner the various components of the machine being controlled.

If it is desired to shut down the machine, the stop button in the operator control 15 is pressed to provide an appropriate signal to the stop sequence memory unit 37. The particular stop sequence utilized depends upon the type of machine being controlled and the appropriate commands are typed by means of a decimal keyboard into a memory unit in the central console 21. This information is coupled to the stop sequence memory unit 37 via the data link shift register 25. The stop sequence control commands are coupled from the stop sequence memory 37 to the enable gating circuit 31 and then to the decoder and valve driver circuit 33 for appropriately controlling the various machine components of the machine being controlled.

The operational sequences of the main storage memory and the firing order latch circuit are each coupled to a data accumulator shift register 39 which in turn couples the input information thereto in serial fashion back to the central console where this data may be recorded on tape for replay should the same machine cycle be again run.

Should it be desired that the machine be started or stopped on a manual basis, a manual switch 41 is closed. This enables the machine section firing order to be selected from a T.W.S. and overrides the program start and stop memories with hardwired circuitry for a simple start and stop procedure.

Figure 3A:
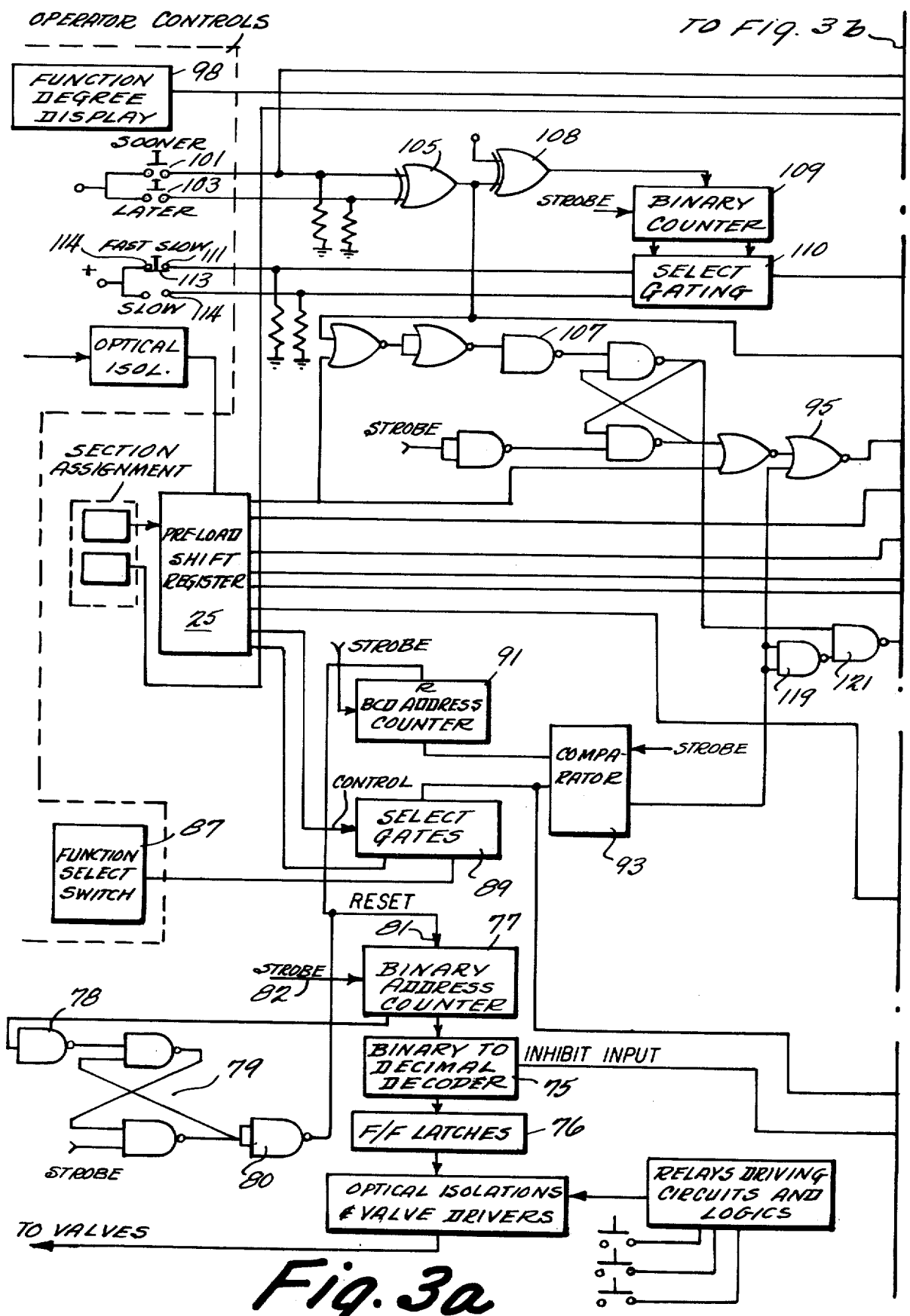
FIGS. 3a and 3b are detailed schematic block diagrams of the main storage run memory associated with each machine unit of the automatic controller of the present invention.
Figure 3B:
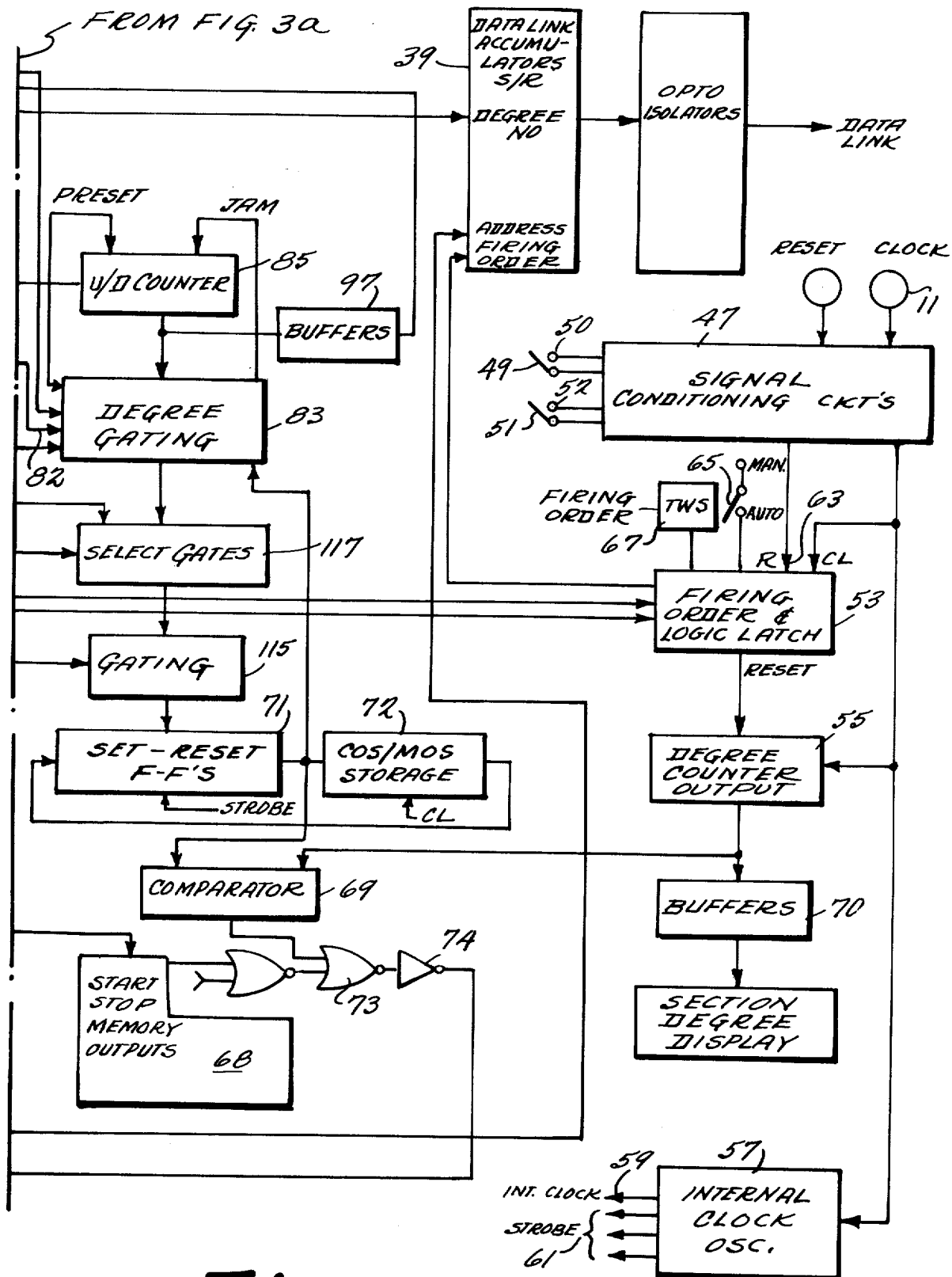

Refer now to FIGS. 3a and 3b which are a more detailed illustration of the main storage running memory unit 27. Referring first to FIG. 3b, the clock and reset input pulses are coupled to the signal conditioning circuit 47. Manual switch 49 is a clock pules signal inverting switch which when closed on contact 50 inverts or phase shifts by 180°, the input train of clock pulses from the pulse generator 11. Switch 51 is a reset signal inverter switch which when closed on contact 52 causes the reset input pulse to be inverted. The reason for inverting either the clock pulses or the reset signal is to prevent the leading and trailing edges of the clock and reset pulses from coinciding with one another. If the trailing edge of the reset pulse and one of the clock pulses coincide, then a counter in the firing order latch circuit 53 would miss a count, thereby introducing error into the machine cycle timing. Should the reset and clock pulses be phase displaced with respect to one another, neither of the switches 49 or 51 need be closed. The inverting function may be accomplished by any suitable means known in the art such as, for example, by means of an inverter wherein the inverter is coupled into the clock pulse or reset signal input circuits by closing switches 49 or 51, respectively.

The clock pulse output of conditioning circut 47 is coupled directly to firing order latch circuit 53, degree counter 55 and an internal clock oscillator 57. In the preferred embodiment the frequency of the clock pulse signal coupled to each of these circuits is 360 pulses per machine cycle. However, because the COS/MOS shift register storage 72 has 64 sections, each of which must be strobed once during each clock pulse interval, the frequency of the output of the machine clock oscillator 11 must be increased by a factor of 64. Accordingly, the internal clock oscillator 57 includes an oscillator which is synchronized by the input clock pulses from the signal conditioning circuit 47. The output of the oscillator is divided by a counter so that the oscillator 57 includes a clock pulse output at terminal 59 having a frequency which is greater than 64 times the cycle clock pulse frequency and a plurality of storbe outputs at terminals 61 which are of the same frequency but phase displaced with respect to one another.

The clock pulse output and the reset output of the signal conditioning circuit 47 are also coupled to the firing order logic and latch circuit 53, which circuit synchronizes the operation of one machine with other interdependent machines. Thus, for example, in the case where a glass forming machine is being controlled, which machine includes several individual sections, the feeder section and delivery mechanism for each individual section of the glass forming machine is synchronized by the firing order latch circuit 53. The clock pulse signals are coupled to a counter within the firing order circut 53 which counter is reset by the reset pulses at input terminal 63. The output of the counter is coupled to a comparator circuit which, when a comparison is made, couples a reset signal to the degree counter circuit 55. The order input to the comparator is derived from one of the following sources: the preload shift register 25 shown in FIG. 3a, the manual switch 65 or a firing order thumbwheel switch 67. The input signal from the preload shift register 25 is derived from the central console and indicates the precise time when each of a plurality of machines are to begin a machine cycle. This signal, when coupled to the comparator in the firing order latch circuit 53, enables an output pulse to degree counter 55 which in effect is a reset pulse for resetting the degree counter. Should it be desirable to control the firing order manually, a manual switch 65 may be closed which then couples a signal to the comparator to enable reset pulses to degree counter 55. On the other hand, if a specific firing order is desired to take place in the future, a thumbwheel switch 67 may be appropriately set so that after a predetermined number of clock pulses have entered the firing order latch circuit 53, the thumbwheel switch provides a signal to the comparator for enabling a reset pulse to the degree counter 55.

The output of the firing order circuit 53 is also coupled to the data link accumulator 39 which couples the timing information of when the reset pulse coupled to degree counter 55 is generated to the central console for recording on a suitable recording means such as magnetic tape.

The degree counter 55 converts the pulse count to a parallel ten bit word to indicate how many degrees the machine being controlled has advanced in a machine cycle. Thus, the degree counter 55 provides an output train of 360 words after which it is reset by a reset signal from the firing order circuit 53. The output of the degree counter is coupled to a comparator 69 and to an output display panel via a drive buffer 70. The degree display may be, for example, a light emitting diode display, a Nixie tube or any other suitable visual display means.

The comparator 69 has another input thereto derived from the output of set-reset flip-flop circuit 71 which sequentially provides at its output up to 64 machine component cycle actuating times. The output of the set-reset flip-flop 71 is also coupled to a ten, 64-bit shift register storage 72. As aforementioned, for each pulse generated by the pulse generator, 64 clock pulses are generated by the internal clock oscillator 57 and used to clock the ten, 64-bit shift registers and reset the flip-flops 71. In this manner, all of the information in the storage registers is circulated from storage 72 to the flip-flops 71 and back again and compared with the degree counter output 55 by means of comparator 69 during each pulse interval of the output from the degree counter 55.

Figure 4:
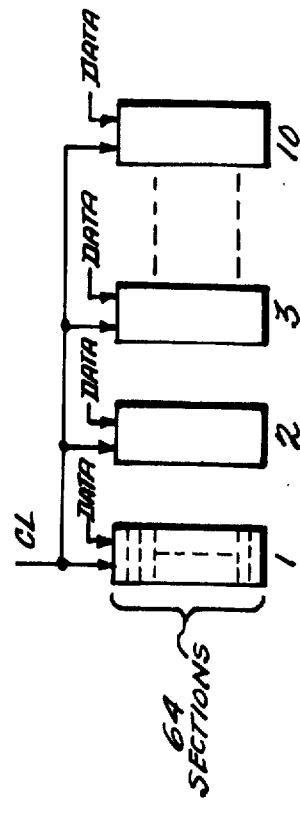
FIG. 4 is a block diagram of the COS/MOS storage means for storing the machine component actuating time signals.

Refer now to FIG. 4 which is a more detailed illustration of the ten, 64-bit storage registers. As shown, ten shift registers are each aligned in parallel with each shift register having 64 sections. Data is coupled into the shift registers in parallel and is stepped through the shift registers by means of the clock pulses derived at the output 59 of the internal clock oscillator 57. At the output of the shift registers a ten-bit word is coupled in parallel to the input of the set-reset flip-flops 71 each time an internal clock pulse is coupled to the shift registers. The word stored in the set-reset flip-flops 71 is then read back in parallel into the first section of each of the shift registers and at the same time is coupled to the comparator 69. The flip-flops are reset by means of strobe pulses from the internal clock oscillator; the strobe pulses resetting the flip-flops at the same frequency as the ten-bit words are read out of and into the COS/MOS shift register storage unit 72.

In operation, assume for example that the degree counter 55 has reached the number 120, that is, the machine has moved through ⅓ of its cycle. Sixty-four clock pulses are generated by the internal clock oscillator 57 and are utilized to clock the ten shift registers memory 72 through all 64 stages before the output of the degree counter 55 goes to 121. As each ten-bit number is clocked out of the registers and back into the shift registers via the setreset flip-flops 71, the number or word appears at the input of the comparator 69. Suppose, for example, that one of the numbers stored in the shift register 72 is the number 120, that is, a machine component, for example the blank mold, is to be actuated at this time. One of the numbers stored in the shift registers 72 will then be 120. Since the output of the degree counter 55 is 120 and one of the 64 stored numbers in the memory 72 is 120, a compare signal will be provided at the output of comparator 69 and coupled to one input of NOR gate 73 at the time when the stored number 120 appears at the output of the flip-flops 71. This signal is inverted by inverter 74 and coupled to the inhibit input of a binary to decimal decoder 75 shown on FIG. 3a. This signal, which might be called an actuating signal, gates the binary to decimal decoder 75 as will be more fully understood hereinbelow so that an appropriate flip-flop latch 76 is actuated.

The manner in which the recirculating memory and degree count pulse generator cooperate to provide an actuating signal at the precise time that a machine component is to be enabled or inhibited has been described. Now a means must be provided for determining which component is to be actuated. To achieve this a component addressing circuit including binary address counter 77 is provided. The binary address counter 77 counts at a rate of 64 counts per input machine clock pulse, i.e., the binary address counter counts at the same rate as the pulse frequency at the output of the internal clock oscillator 57. The binary address counter 77 is reset at a count of 64 by means of a resetting circuit which includes NAND gate 78, set-reset flip-flop 79 and buffer gate 80. The binary address counter is synchronized with the system by means of a sync input 82 which is coupled to one of the strobe outputs 61 of the internal clock oscillator. Each of the 64 counts provided by the binary address counter represents the address of a flip-flop latch associated with a machine component to be actuated. Thus, assume for example that of the 64 storage sections in the main shift register storage 72, the 30th storage section contains the word which represents the time at which a machine component is to be actuated. A comparison signal is generated when the contents of the 30th storage section appears at the output of flip-flop circuit 71 and is coupled to the binary to decimal decoder 75. At the same time, the binary address counter is at a count of thirty which count when coupled to the binary to decimal decoder is converted to a command pulse which is coupled to the flip-flop 76 whose address is 30. The flip-flop provides an output command signal which is coupled via an isolation circuit to an appropriate valve driver, such as for example, a solenoid which is associated with the energized latch. The solenoid in turn operates the valve which turns on or shuts off power to the component to be enabled or inhibited, respectively.

On occasions it may be desirable to change the time in a cycle at which one or more machine components are actuated. In order to accomplish this, appropriate numbers or words stored in the running memory 72 must be changed. By the unique arrangement of the present invention, this change can be effected simply and efficiently during the operation of the system.

Thus, the output of the set-reset flip-flop 71, which is coupled to the comparator 69 and storage shift register 72, is also coupled to a degree gating circuit 83 and is coupled therethrough to the jam input of an up-down counter 85. The jam input resets the up-down counter to whatever level of count appears on the jam input line. However, the presetting of the up-down counter cannot occur until a preset enable signal is coupled thereto. The manner in which the preset signal is generated will now be described. A function select switch in the operator control panel is actuated to couple its address number to the select gate 89. The address number will be one of the 64 addresses number 0 thru 63 in the ten, 64-bit shift registers 72 and corresponds to the address of a selected machine component. The select gate 89 is a quad and/or select gate and may be of any suitable type. However, in the preferred embodiment the select gate is an RCA, CD 4019 quad and/or select gate. At the same time that the address of a selected machine element is being read into the select gate 89, a binary coded decimal address counter 91 is counting in synchronism with the binary address counter 77 and the 64-bit shift registers 72. When the binary coded address counter 91 reaches the same count as in the select gate 89, a comparison is made by comparator 93. The comparator 93 accordingly provides an output to NOR gate 95, which in turn couples its output to one input of the degree gating circuit 83. The degree gating circuit 83 provides an output preset enable signal to the up-down counter 85 and accordingly the number at the jam input thereof is read into the up-down counter to preset the up-down counter to the count on the jam input line. This number is the same as that at the output of the flip-flops 71 and is the relative cycle time at which the selected machine element is to be enabled or inhibited.

The output of the up-down counter is coupled to a buffer 97 which drives a function degree display 98 in the operator control, which display indicates the degree or time at which the selected component is to be actuated. The output of the up-down counter also is coupled through several logic blocks to the set-reset flip-flop 71, as will be described more fully hereinbelow.

If the operator wants to change the timing position of the function selected, which time position appears at the output display 98, he pushes either the sooner or later button 101 and 103, respectively, depending upon whether he wants the time of operation of the machine element to be advanced or retracted. The resulting signal is coupled via an exclusive OR gate 105 to one input of a timing control circuit designated by the numeral 107 and at the same time to the control input 82 of the degree gating circuit 83. The output of exclusive OR gate 105 is also coupled to a second exclusive OR gate 108 and then to a binary counter 109 which provides one pulse per 512 machine degree pulse train at one output thereof and one pulse per 8192 degree pulse train at the other output thereof. Accordingly, the output frequencies of counter 109 are 1/512 and 1/8192 the frequency of the output of the degree counter 55, respectively. These outputs are coupled to the select gating circuit 110 which is of the same type as the select gate 89.

If it is desired to have the up-down couner count at a standard slow pace, the switch arm 111 of the fast slew switch 113 is coupled to the slow slew terminals 114 to thereby gate the one pulse per 8192 degree output of the binary counter 109 to the up-down counter 85. On the other hand, if it is desired to have the up-down counter count fast, the fast slew switch is coupled to the fast slew contacts 114, thereby providing a gating signal to the select gating circuit 110 which inhibits the one pulse per 8192 degree signal and enables the ten pulse per 512 degree signal. Hence the up-down counter will count at a fast rate.

The output of the up-down counter is applied to the set-reset flip-flops 71 via the degree gating circuit 83, select gates 117 and gate 115. Because of the gating block 115 which normally inhibits the output of the up-down counter, the output of the up-down counter is not directly connected to flip-flops 71 until the number from the appropriate storage section of the ten 64-bit shift registers is coupled to gating 115. This occurs when the output of the BCD address counter 91 is equal to the output of the select gate 89 derived from the function select switch. Accordingly, a compare signal is provided at the output comparator 93 which enables gating block 115. It should be noted that this gating block is enabled when a comparison is made with the "sooner" or "later" button depressed. The gate inhibiting signal is derived from the timing control circuit 107. This prevents a premature reading in of a new number into the set-reset flip-flops 71.

The aforementioned has been a description of the operation of the means for changing the stored numbers in the ten shift register storage 72. However, when the control system is initially being set up, appropriate degree numbers are inserted into the various sections of the memory 72 via the set-reset flip-flop 71. To achieve this, the respective degree numbers associated with each component of the machine being controlled is coupled to a preload register 25, the output of which provides a number of signals. A first signal is the degree number which will be read into the memory 72. This number in binary form is coupled to a select gate 117 which is of the same type as select gate 89. At the same time a control pulse is coupled to the control gate input of the select gate 117 to enable the preload shift register input thereto and to inhibit the input from the degree gating circuit 83. Accordingly, the output of the select gate 17 is coupled to gating block 115. However, gating block 115 will not gate the output of the select gate 117 to the set-reset flip-flop 71 until a comparison occurs between the output of BCD address counter 91 and the output of select gate 89. Accordingly, a second input to the select gate 89 is derived from the preload shift register, which input indicates which address in the memory unit 72 the degree number signal will be stored. A second input to the select gate, designated the control input, inhibits the signal derived from the function select switch and enables the address number derived from the preload shift register. Accordingly, when a comparison is made between the output of the select gate 89 and the BCD address counter 91, comparator 93 provides an enabling pulse via NAND gates 119, 121 to the gating block 115. At this point in time the information from the preload shift register 25 is coupled to the set-reset flip-flop 71 and entered into the memory section 72. This sequence of events continues until a degree count has been provided for each of the components to be operated. At this point in time the system is now ready for operation.

Figure 5:
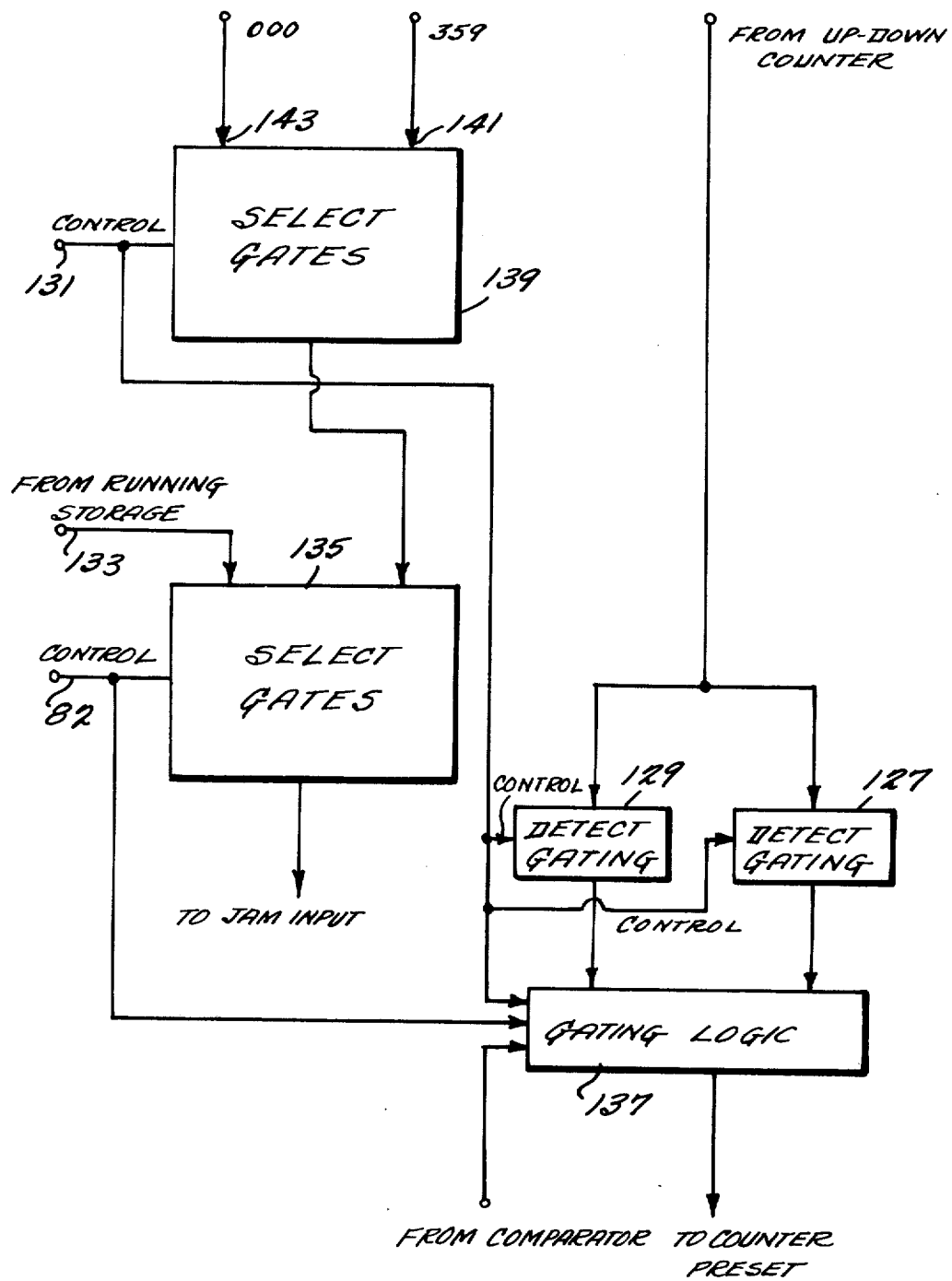
FIG. 5 is a block diagram of a circuit for controlling the operation of the up-down counter of the main memory section of the controller.

Refer now to FIG. 5 which is a more detailed illustration of the degree gating circuit 83. The 0 to 359 degree gating circuit 83 is only required since the machine operation and the timing thereof are controlled on the basis of machine cycles as opposed to a standard time base. If the standard time base were being utilized, the degree gating circuit 83 would not be needed and the up-down counter 85 would be controlled directly by the sooner and later buttons and the output of the comparator 93. However, since the preferred embodiment is being described in connection with a machine which is controlled in accordance with the degrees of rotation of a cyclic element therein, the degree gating circuit 83 is required. Thus when counting up, once the up-down counter reaches a count of 360, it must be returned to the count of 0 rather than proceed onward to 361. Hence, when the up-down counter reaches a count of 360 while counting up, the count of zero is jammed into the input of the up-down counter. In the same manner, when counting downward and the count goes from zero to 999, the count of 359 must be jammed into the up-down counter so that the counter can continue to count downward from 359.

Initially the degree number output of the set-reset flip-flop 71 is coupled to input 133 of select gate 135. This signal is normally coupled by the select gate which is similar to the select gate 89, to the jam input of the up-down counter. Thus the counter will initially be preset to the degree number of the function selected by the function select switch 87 when the sooner and later push buttons are not depressed. When, however, the sooner or later push buttons are depressed, a signal derived from the output of exclusive OR gate 105 is coupled to the control input 82 of select gate 135 and to the gating logic circuit 137. Thus, the output from the flip-flop 71 is inhibited and the output from select gate 139 is enabled. Select gate 139 has two inputs. The first input terminal 141 has the BCD number 359 coupled thereto and the other terminal 143 has the BCD number 000 coupled thereto. When, for example, the later push button is depressed, indicating that the up-down counter is going to count up, a logic one appears at the control input 131 of select gate 139 which signal is derived from the sooner control switch 113. The input at terminal 143 is thereby enabled and is coupled to the select gate 135 and then to the jam input of the up-down counter. This member which is 000 is not entered into the up-down counter however until the count of the counter reaches 360 as will be more fully explained hereinbelow. If on the other hand the sooner push button is depressed, then the up-down counter must count down. Accordingly, a logical zero appears at the control input of gate 139 and the input 141, which is the BCD number 359, is coupled via select gate 135 to the jam input of the up-down counter. This number will not preset the up-down counter 359 however until the counter counts downwardly through 0 to 999.

The sooner control signal is also coupled to the control input of gating circuits 127 and 129. Gating circuit 127 detects when the count has reached 360° and the gating circuit 129 detects when the count has reached 999 from the count of zero. When the "latter" button is pressed, gating circuit 127 is enabled. The input to the gating circuits 127 and 129, derived from input terminal 125, is the binary coded decimal output of the up-down counter. The outputs of the detect gating circuits 127 and 129 are coupled to a gating and logic circuit 137 with the output of the gating-logic circuit being coupled to the enable preset input of the up-down counter to thereby enable the signal at the jam input thereof to appropriately reset the up-down counter.

In operation with the function select signal switch 87 actuated, a degree count associated with the function selected is coupled into the up-down counter via the jam input thereof in the following manner. The degree gating number is coupled to the input terminal 133 of select gate 135, and passes through select gate 135 to the jam input of the up-down counter. This signal is entered into the up-down counter and appropriately presets the up-down counter when an enabling signal is provided to the logic gating circuit 137 from the comparator 93.

Next assume that it is desired to have the component being controlled actuated at a sooner time. The sooner button is depressed and the up-down counter begins to count downward. At the same time the input binary coded decimal number 359 at terminal 141 is coupled via select gates 139 and 135 to the jam input of the up-down counter. At the same time, the detect gating circuit 129 is enabled. Then, as the up-down counter counts downward through zero to 999, the detect gating circuit 129 provides an output pulse to gating logic 137. In the meantime, the gating logic has been enabled by a signal on line 145, which signal exists whenever the sooner or later button is depressed. Accordingly when the detect gating circuit 129 detects the number 999, a preset enabling pulse is coupled to the preset input of the up-down counter to permit the up-down counter to enter the number 359 therein. Then the counter continues to count downwardly until such time as the operator releases the sooner button.

Figure 6:
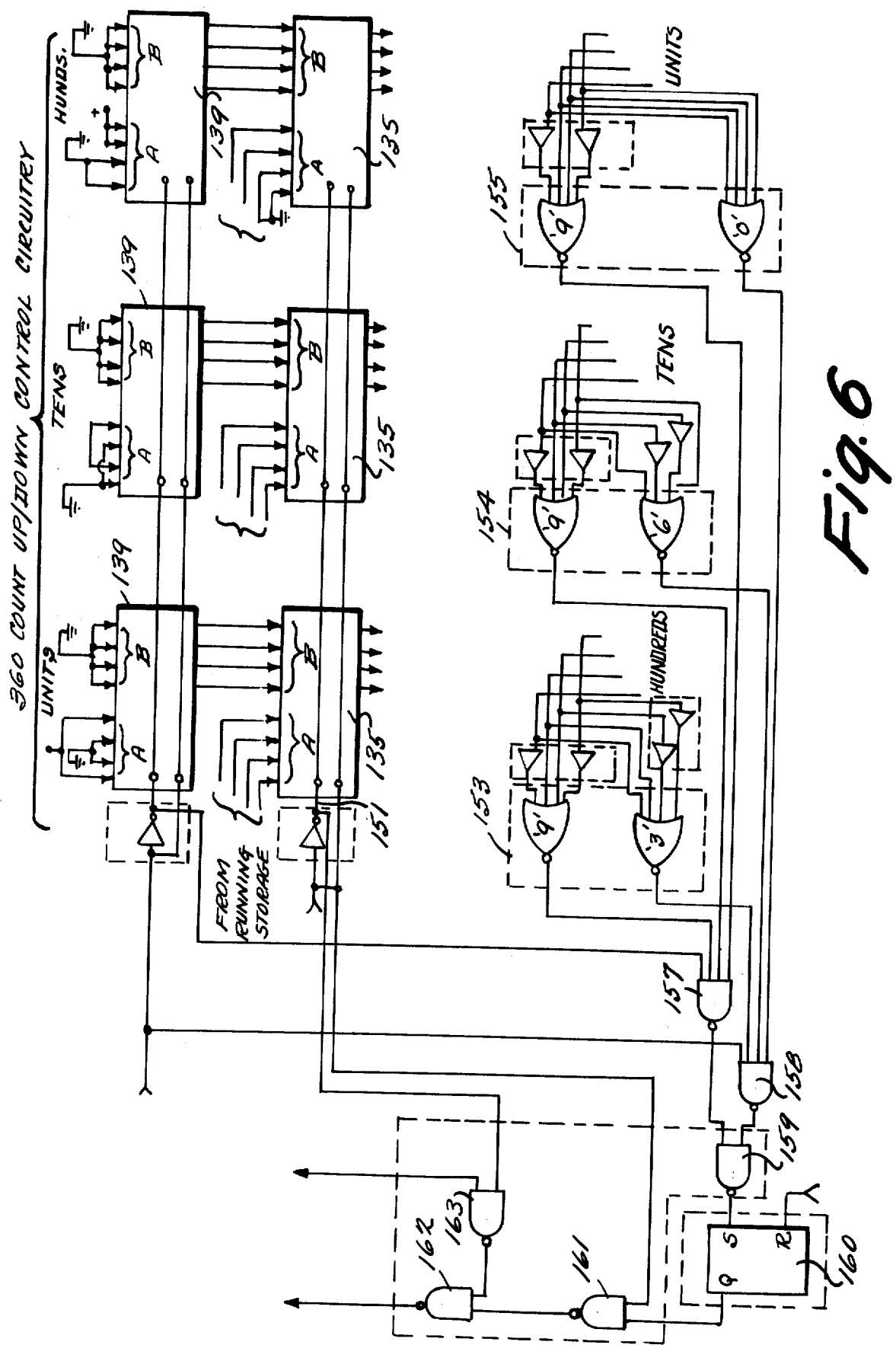
FIG. 6 is a more detailed schematic block diagram of the up-down counter-control circuitry of FIG. 5.

Refer now to FIG. 6 which is a more detailed drawing of the circuitry for controlling the up-down counter. The select gates 135 and 139, shown in FIG. 5, are each comprised of three RCA CD 4019 quad and/or select gates connected in parallel. One input, that is, the A input to the select gates 139, is the numeral 359 and the other input B is the numeral 000, each in binary coded decimal form. These signals are appropriately gated to the next select gate 135 via a signal from the sooner push button which signal is a logical one when the count is up and a logical zero when the count is down. Thus, when the count is going up, the B input to select gate 135, that is 000, is coupled in BCD form to the B input of select gate 135. At the same time the degree number from the memory circuit 72 is coupled to the A input of select gate 135. A second control signal, which is generated when either the sooner or later button is closed, is coupled to the control input of the select gate 135 to enable passage therethrough of the B terminal input signal. Thus, when the input at terminal 151 is a logical zero, the input at the B terminal is coupled through the select gate 135 to the output thereof, which output is coupled to the jam input of the up-down counter. On the other hand, when the input is a logical 1, the A input is coupled to the jam input of the up-down counter.

The combination of inverters and NOR gates designated by the numerals 153–155 are the 360 and 999 detect gates 127 and 129, respectively. Thus, the output of the up-down counter is coupled respectively to the units, tens and hundreds inputs of the gates 155, 154 and 153, respectively. The NOR gates designated by the numerals 999 each provide a logical 1 output when the output of the up-down counter is 999. This signal is coupled to a NAND gate 157. The NOR gates designated by the numerals 360 provide a logical one signal at their outputs when the output of the up-down counter is 360. This output is coupled to the input of a second NAND gate 158. The other input of NAND gate 157 derived from the control input to gate 139 is a logical 1 when the up-down counter is counting down and a logical 0 when it is counting up. The other input to NAND gate 158 is a logical 1 when the up-down counter is counting up and 0 when it is counting down. Accordingly, the NAND gates 157, 158 each provide at their outputs a logical 0 when a number is to be jammed into the up-down counter. Hence, the output of NAND gate 159, which is normally 0, goes to a logical 1 when the output of the up-down counter is either 999 or 360. When a logical 1 output is generated by NAND gate 159, the output of set-reset flip-flop 160 goes high to a logical 1 which output is coupled to one input of NAND gate 161. The other input to the NAND gate 161 is the inverse of the signal appearing at terminal 151 of gate 135, and accordingly is a logical one when the up-down counter is being stepped and a logical 0 when the up-down counter is not in operation. Accordingly, the output of NAND gate 161, which is normally a logical 0, becomes a logical 1 when either the numeral 000 or 359 is to be jammed into the up-down counter. This signal is coupled to one input of another NAND gate 162. The other input to NAND gate 162 is derived from NAND gate 163 which has at one input thereof a signal derived from the comparator 93 and at the other input a signal derived from terminal 151. Thus, when a logical 1 signal from comparator 93 is provided at the input of NAND gate 163, an output jam enabling signal is provided under the following circumstances: (1) when the sooner or later buttons have not been depressed and hence the signal at terminal 151 is 1 and the output of NAND gate 161 is 1, in which case the A input to select gate 135 from the flip-flops 71 is read into the jam input of the up-down counter; (2) when the sooner or later button is depressed and the comparator 93 has generated a logical 1 signal, and the number 360 or 999 has been reached by the up-down counter. In this case the number 000 or 359 is read into the up-down counter. In each of these cases a logical 1 signal is provided at the output of NAND gate 162 to thereby cause the signal at the jam input of the up-down counter to preset the up-down counter.

Figure 7:
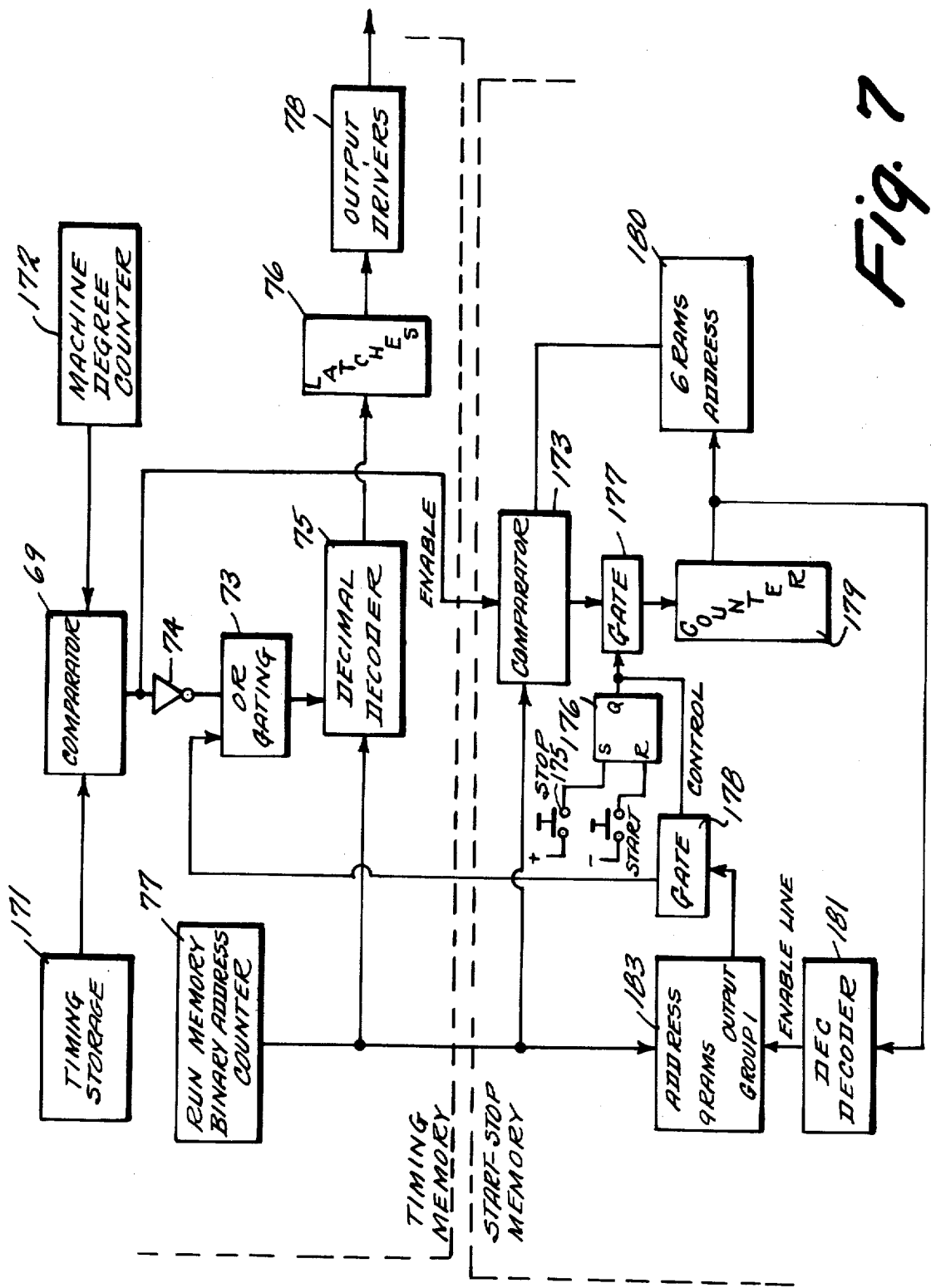
FIG. 7 is a block diagram of the start-stop control memory.

Refer now to FIG. 7 where there is disclosed a simplified block diagram of the start-stop memory unit illustrated in FIG. 2 and designated in FIG. 3b by the numeral 68. The timing storage unit 171 includes the circulating memory comprising the set-reset flip-flops 71 and the ten 64-section shift registers 72. The machine degree counter 172 includes the pulse generator and the degree counter 55, both illustrated in FIG. 3b. The outputs of the timing storage and the degree counter are each coupled to the comparator 69 which provides an appropriate output signal when a comparison exists. This signal is coupled via an inverter 74 and an OR gating circuit 73 to a decimal decoder 75. Each of these elements are illustrated in FIG. 3. The output of the comparator 69 is also coupled to a second comparator 173.

When a comparison is made in comparator 69, the particular memory address in the binary address counter 77 corresponding to the machine element to be controlled at that point in the cycle is coupled to the decimal decoder, decoded and then coupled to a latch circuit 76 which provides a command signal for energizing output driver 78 associated with the latch count. At the same time comparator 173 compares the address in the run memory binary address counter 77 with a corresponding address in the six random access memories (RAMS) in address memory 180. Each of the six random access memory units are capable of storing 64 bits. Accordingly, since the 6 RAMS are connected in parallel, 64 six-bit machine addresses can be stored therein. However, in the preferred embodiment wherein a glass forming machine is being controlled, only nine addresses are stored therein.

However, unless the start or stop switch is closed on its contacts, the comparator 173 will not provide an output since gate 177 is inhibited. When, for example, stop switch 175 is closed on its contacts, the set-reset flip-flop 176 provides a logical one output which is coupled to gate 177 and gate 178. Gate 177 is thereby enabled to couple the output of comparator 173 to a stepping counter 179. The stepping counter steps the next address in the 6 RAM address unit 180 so that it can be compared in comparator 173. The output of the counter 179 addresses sequentially each of the nine stored address words depending upon the count of the output of the counter. The output of the counter is also connected to a BCD to decimal decoder 181 which converts the binary output of counter 179 to a corresponding decimal output. Accordingly, the output of the decoder 181 is in the form of nine parallel outputs which are connected to an associated one of nine RAMS in function memory 183. Each RAM in memory 183 stores an inhibit or an enable signal for 64 outputs. Thus, each RAM provides an output for each storage section in the 64 word storage of the run memory 72 of FIG. 3. Thus, when counter 179 makes a first count, an output from the decoder 181 is coupled to the first RAM in storage 183 to enable the first RAM. The inhibit and enable signals in enabled RAM are gated through gate 178 and OR gate 73 to the decimal decoder 75. Decimal decoder 75 is inhibited or enabled depending upon the output of the enabled RAM of storage 183 to thereby selectively couple output signals to the latches 76 which in turn drive selected output drivers 78. The sequence in which the enabling and inhibiting signals are coupled to gate 178 from storage 183 is controlled by the output of run memory binary address counter 77 which addresses the 64 storage locations in the first RAM in a sequential manner. After the first RAM has been read out, the machine cycle continues until another compare exists in which case, the count of counter 179 increases and the second RAM in memory 183 is enabled, and so on.

The shutting down process continues with counter 179 progressively stepping the address memory 180 and the nine RAMS of the function storage 183 until the machine has been shut down. A similar operation with a second set of address function memories occurs when a machine is to be started up.

Figure 8A:
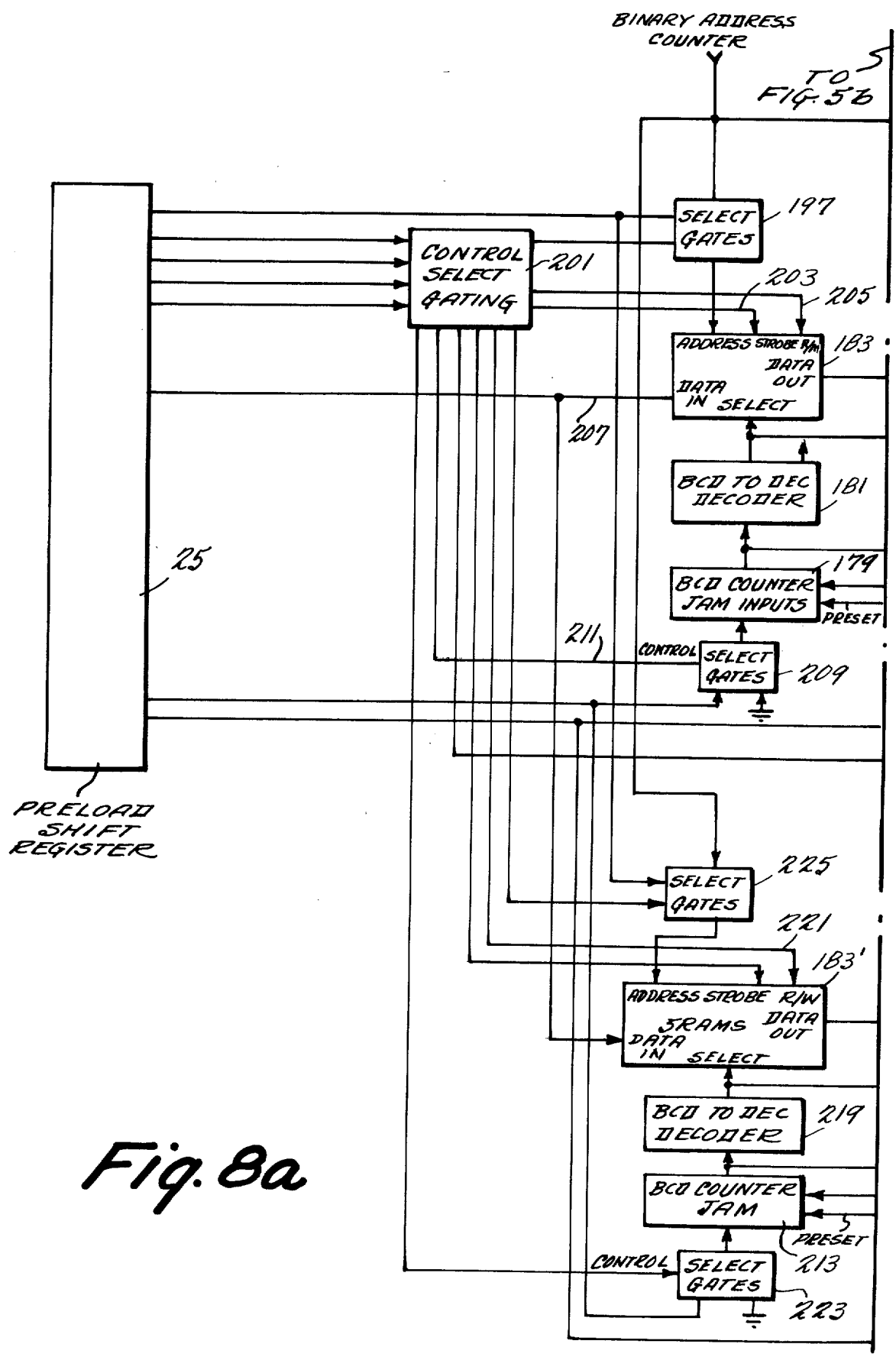
FIGS. 8a and 8b are detailed schematic block diagrams of the start-stop control memory of FIG. 7.
Figure 8B:
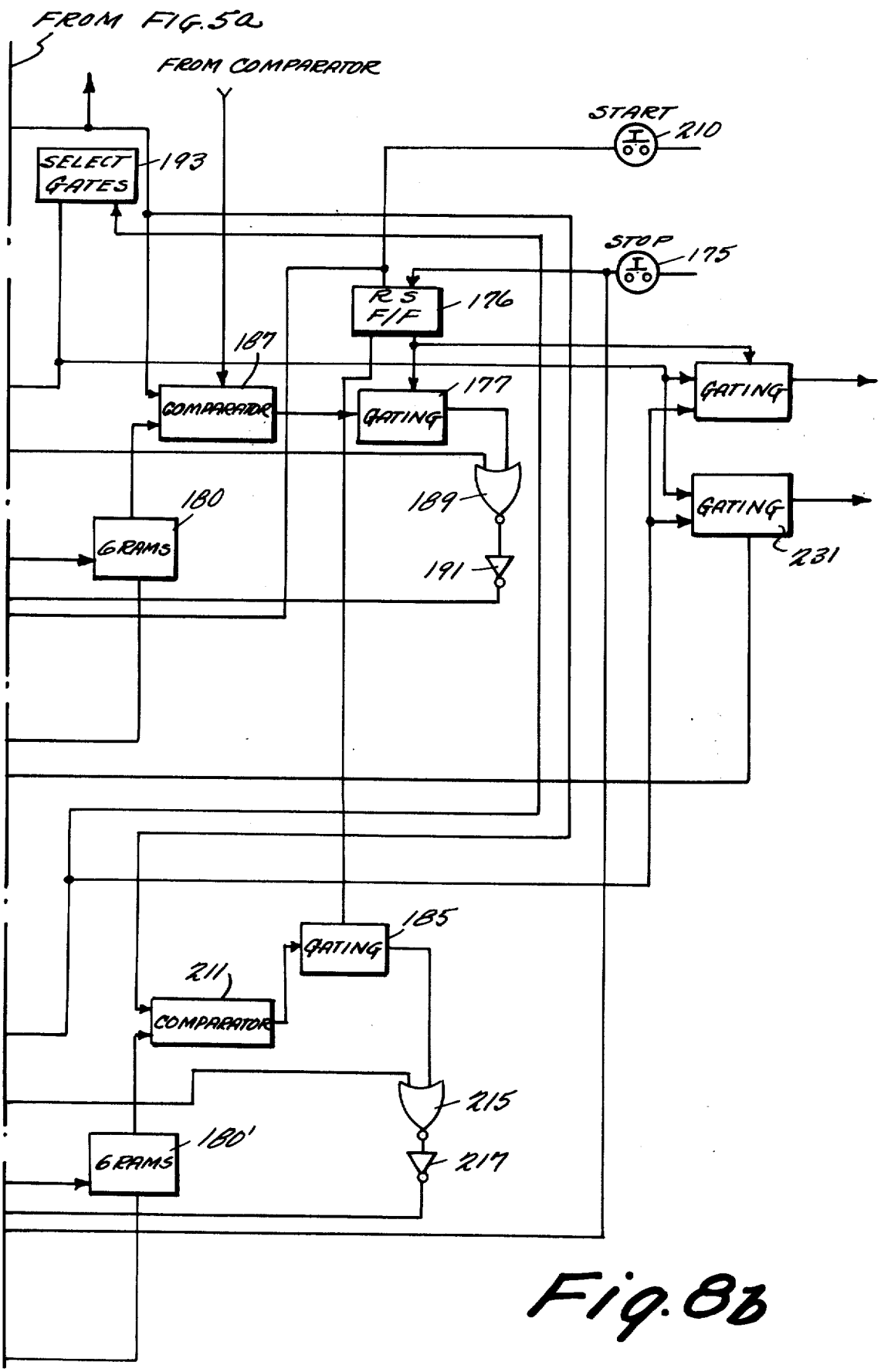

Refer now to FIGS. 8a and 8b for a more detailed discussion of the start-stop memory arrangement of the present invention. Two separate memories are provided, a starting memory which includes a six RAM address storage 180' and a 5-RAM function storage 183'. The stop memory includes a 6-RAM address storage 180 and a 9-RAM function memory 183.

The operation of the stop memory will now be discussed in detail. When the machine being controlled is to be stopped, the stop button 175 is closed to thereby set flip-flop 176 so that a logical 1 is coupled to gating circuit 177 to thereby enable the gating circuit. At the same time, a logical 0 is coupled from flip-flop 176 to gating circuit 185 to inhibit the gating circuit 185. In the meantime, the binary address counter 77 sequentially provides the address of each of the 64 machine functions to comparator 187. The other input to comparator 187 is from the 6-RAM address storage unit 180 which provides the address of the machine components to be inhibited during the shutting down process. When a stored degree number in the running memory 72 of FIG. 3 compares with the machine degree counter output, a strobe signal is applied to comparator 187. With comparator 187 enabled, the address output of counter 77 is coupled to one input of the comparator and the first address in the address memory 187 is coupled to the other input thereof. If a comparison exists, then an output from comparator 187 is coupled to BCD counter 179 via gating circuit 177, NOR gate 189 and an inverter 191. The BCD counter counts a pulse and steps the address storage unit 180 to the next address location. At the same time, the output of the BCD counter 179 is coupled to a BCD to decimal decoder 181. The output of the decoder 181 is in the form of ten parallel output circuits of which only nine are utilized in the present invention. The nine output circuits are each coupled to a separate RAM in the function storage unit 183. Thus, when BCD counter 179 receives a first pulse from comparator 187, the first output circuit of the BCD to decimal decoder 181 is energized to enable the first RAM. Under normal operating conditions, the first RAM reads out a plurality of enable and inhibit signals in a sequential order controlled by the binary addresses stored in counter 77. Thus binary address counter 77 provides a sequence of up to 64 addresses to the first enabled RAM so that the RAM reads out in sequential order up to 64 commands, the commands being either to enable or inhibit a corresponding component of the machine being controlled. The output of the function memory 183 is coupled to an OR gate 193, the output of which is coupled to the binary to decimal decoder 75, shown in FIG. 3a.

The next time a comparison is made between a stored degree number and the machine degree count, a strobe signal is coupled to comparator 187 to enable the comparator. The second address stored in address storage 180 is compared with the binary address of counter 77 and when a comparison exists, the BCD counter 179 is advanced a second step. Hence, the address stored in address storage means 180 is stepped one position and the second RAM is enabled. In accordance with the sequence dictated by the output of the binary address counter 77, a second sequence of enables and inhibits are generated by the memory unit 183 and coupled to the output via select gate 193 for controlling the shutting down of the machine being controlled. The aforementioned sequence repeats itself each time until the machine has been completely shut down. After nine cycles of operation have been completed, the BCD to decimal counter 181 provides an inhibit output to NOR gate 189 which prohibits further stepping of the BCD counter 179. Thus, the shutting down function provided by the stop memory is completed.

The timing for reading out each of the RAMS is provided by a clock strobe signal on line 203 while the control of reading and writing commands out of and into the RAMS is provided by an appropriate signal on line 205. Hence the signal on line 205 dictates whether data is being read into the RAM or read out thereof. The particular machine control insturctions written into each RAM are provided on line 207 from the preload shift register 25. Thus, if the first RAM is to be loaded with a selected number of enable signals and a selected number of inhibit signals, the select gate 209 is enabled by a control signal on line 211 to conduct a first pulse from the preload shift register 25 to the jam input of BCD counter 179. The output of the BCD counter 179 is converted to a decimal signal by decoder 181 which provides an enabling signal to the first RAM of the function memory 183. With the appropriate write signal on line 205, the selected enable and inhibit commands are read into the RAM in accordance with the sequence dictated by a signal from the preload shift register 75 via the select gate 197. The process repeats itself with a second input pulse coupled to select gate 209 to thereby step counter 179 to the second RAM. The inhibit and enable commands for the second RAM are then read into the memory 183. This process repeats itself until all nine RAMS are loaded and the system is ready for operation.

The stop memory arrangement is quite flexible since a machine having a plurality of movable components can be stopped in a single step or in a plurality of steps up to nine, as contemplated by the preferred embodiment. However, it should be understood that as many shut-down steps can be provided as desired by merely providing an extra RAM for each extra shutting down step. Further, the sequence of sutting down the machine can be varied by appropriately writing in new commands to the RAMS via line 207 from the preload shift register.

If, for example, the machine to be controlled is to be started up, the start button 210 is depressed to thereby provide an input signal to the reset input of the flip-flop 176. The flip-flop 176 provides an output in response thereto which turns off gating circuit 177 and turns on gating circuit 185. With gating circuit 185 enabled, comparator 211 compares the output of the binary address counter 77 with the storage address in the address storage memory 180'. If a comparison exists, comparator 211 provides an output which is coupled to the BCD counter 213 via NOR gate 215 and the inverter 217. The BCD counter provides a stepping signal to the address memory 180' to designate the next succeeding address to be read into the comparator 211. At the same time the output of the BCD counter is decoded by a BCD to decimal decoder 219. The decoder 219 utilizes only five of its ten output terminals which outputs are coupled to five random access memory units in the function storage 183'. As in the case with the stop memory unit, the output of the decoder sequentially enables the five random access memory units as the BCD counter 213 is stepped by pulses from comparator 211. Each of the random access memories includes enable and inhibit commands for each of the 64 storage units or addresses in the run memory. Thus, when the first random access memory is enabled by an output from the decoder 219, the commands in the random access memory are sequentially read out in a sequence dictated by the output of the binary address counter 77. The command signals are coupled to select gate 193 and then coupled to one input of OR gate 73 which is illustrated in FIG. 3b. The output of the OR gate 73, as aforementioned, is coupled to the inhibit input of the binary decimal decoder 75 for appropriately energizing selected flip-flop latches associated with the respective machine components. It should be understood that while only five RAMS are disclosed in the preferred embodiment, as many RAMS as desired could be utilized in keeping with the present invention provided there is one RAM for each starting up step.

The input data to the function memory 183' for initially storing the commands in the various random access memory units therein is controlled by a read-write command on line 221. Thus, when a write strobe is coupled to the read-write terminal of the function memory 183', input data is read into the five RAMS from the preload shift register 25 in locations which are dependent upon how many input pulses have been coupled to the BCD counter 213 via select gate 223 and the address location sequentially designated by the address pulses from the preload shift register 25 via the select gate 225.

From the aforementioned discussion of the start-stop program memory circuitry, it can be seen that the sequence of operation of the machine being controlled when being started or shut down can be selectively designated by appropriately entering commands into the preload shift register 25 from the central console. The starting and stopping commands can be quite complex, requiring a number of discrete steps wherein a number of machine components are actuated during each machine step. On the other hand, the starting and stopping process can be quite simple requiring only one machine step during which each of the components of the machine is either shut down or started up. In such a case, only one random access memory could be required in each of the function memories 183 and 183' and only one storage address would be stored in the address memory units 180 and 180'.

The control select gate 201 selectively controls when data is to be read into or out of the random access memory units in function memories 183 and 183'. In addition, the control select gate controls the timing of when the RAM select gates 209 and 223 are to be enabled so that another RAM can be addressed. Finally, the control select gate enables select gates 197 and 225 to couple the address output of memory address counter 77 or the address output of the preload shift register to the RAM for addressing the storage elements in each RAM.

After the operation of a start and stop process, the specific instructions for starting and stopping the machine can be observed via gate 231. Thus by providing a control pulse output of control select gating circuit 201, gate 231 is enabled. With gate 231 enabled, inhibit and enable commands from the respective random access memory units in the function memories 183 and 183' are coupled in a serial train to the data accumulator shift register 39 illustrated in FIG. 2. The data accumulator shift register 39 couples the enable and inhibit commands to the central console where the commands are observed on a light emitting diode display.

From the foregoing it can be seen that applicants have provided a simplified, yet flexible, automatic control system which not only provides control of the operation of a variety of different machines but also provides for the control of a plurality of machines which are interdependent timewise with respect to one another and wherein a predetermined starting and stopping procedure must be followed in order to safely and efficiently start and stop the operation of the machine. While the aforementioned automatic programmable controller has been described in connection with the preferred embodiment, it should be understood that there are other embodiments which fall within the spirit and scope of the present invention as defined by the following claims.

What is claimed is:

1. A programmable automatic controller for controlling at least one machine, said at least one machine including a plurality of cyclically movable components which are actuated in a timed relationship with respect to one another, said movable components each being actuated at respective relative times in each of a plurality of machine cycles, and said at least one machine including machine cycle position indicating means for cyclically moving in synchronism with the cyclic operation of said at least one machine, said controller comprising:

timing means responsive to said machine cycle position indicating means for generating a digital signal in synchronism with the movement of said cycle position indicating means, said digital signal providing an instantaneous indication of the time elapsed in each cycle of operation of said machine, a storage means for storing the sequential relative times in a cycle of machine operation when each of the plurality of components is to be actuated, means coupled to said storage means for selectively varying the actuating times of selected components stored in said storage means while said machine is operating to thereby change the relative times in

19 each machine cycle when said selected machine components are to be actuated, means for cyclically reading out the contents of said storage means, comparator means responsive to said timing means and said readout means for comparing the digital signal corresponding to the time elapsed in each cycle with the relative component actuating times stored in said storage means, said comparator providing an actuating signal when a favorable comparison results, and addressing means receiving said actuating signal from said comparator means for providing a component operating command to the component whose component actuating time compared with the cycle time elapsed.

2. The programmable automatic controller of claim 1 further comprising means for initiating a machine starting or stopping sequence at any time during a machine cycle, said machine starting and stopping sequences being preselected to inhibit or enable machine components in a desired sequence.

3. The programmable automatic controller of claim 2 further comprising means for controlling a plurality of machines wherein each of said machines operates in a preselected interdependent timed relationship with respect to one another.

4. The programmable automatic controller of claim 2 wherein said storage means is a circulating storage comprising a sequential access memory means, a set-reset gating means for storing the output of said sequential access memory and for writing into said sequential access memory the data stored in said gating means, and wherein said timing means further comprises means responsive to said machine cycle position indicating means for generating cycle clock pulses in synchronism with the movement of said cycle position indicating means, and an internal clock pulse generating means for stepping said circulating storage means through one cycle of operation each time a machine cycle clock pulse is generated.

5. The programmable automatic controller of claim 4 wherein said sequential access storage means includes a plurality of COS/MOS shift registers connected in parallel to provide a plural bit storage means, said internal clock pulses stepping the data stored therein into said set-reset gating means and then back into the shift registers.

6. The programmable automatic controller of claim 4 wherein said means for selectively varying the component actuating times comprises:

an up-down counter, means for presetting said up-down counter to the cycle actuating time of the selected machine component, means for energizing said up-down counter to selectively count up or down, and means for reading the count of said up-down counter into said sequential storage means when the desired cycle time for component actuation is reached.

7. The programmable automatic controller of claim 6 wherein said means for selectively varying the component actuating times further comprises:

a machine cycle preset enable circuit, said circuit comprising means for detecting when the count of

20 said up-down counter reaches 360 when counting up, means for detecting when the count of said up-down counter reaches 999 when counting down, means for coupling the count of 000 to the jam input of said up-down counter when counting up, means for coupling the count of 359 into the jam input of said up-down counter when counting down, and means responsive to said detecting means for presetting said up-down counter to the count of 0 when the counter reaches the count of 360 when counting up and for presetting the up-down counter to the count of 359 when the count of said up-down counter reaches 999 when counting down, said cycle preset gating circuit thereby forcing said up-down counter to count continuously through 360 counts when the up-down counter is energized to count.

8. The programmable automatic controller of claim 2 wherein said means for initiating a machine starting or stopping sequence comprises:

a first start-stop address memory for storing the addresses of each of the machine components to be enabled or inhibited during the starting or stopping sequence, address means for comparing the address stored in said first start-stop address memory means with the address stored in said addressing means when the cycle time elapsed corresponds to the time a component is to be enabled or inhibited, means in response to a compare by said address comparing means for enabling a selected one of a plurality of random access memory units, and means for reading out the machine actuating commands stored in said random access memory units in sequence, said commends controlling the operation of said machine components.

9. The programmable automatic controller of claim 8 wherein said means for initiating a machine starting or stopping sequence further comprises means for sequentially enabling said random access memory units and for sequentially stepping the addresses stored in said start-stop address memory means as each compare is made by said address comparing means.

10. The programmable automatic controller of claim 9 wherein said start-stop address memory means is a random access memory.

11. The programmable automatic controller of claim 9 further comprising means for initially writing into said sequential storage means and said addressing means the order in which the respective machine components are to be enabled and inhibited.

12. The programmble automatic controller of claim 11 further comprising means for writing into said random access storage means and said start-stop address memory means the order in which the machine is to be started up or shut down.

13. The programmable automatic controller of claim 12 further comprising means for storing the respective times with which the machine components are enabled and inhibited.

14. In a programmable automatic controller for controlling at least one machine, said at least one machine including a plurality of cyclically movable components which are actuated in a timed relationship with respect to one another, said movable components each being actuated at respective relative times in each of a plurality of machine cycles, and said at least one machine including machine cycle position indicating means for cyclically moving in synchronism with the cyclic operation of said at least one machine, a method of controlling said machine comprising the steps of:

generating a digital signal in synchronism with the movement of said cycle position indicating means, said digital signal providing an instantaneous indication of the time elapsed in each cycle of operation of said machine, storing the sequential relative times in a cycle of machine operation when each of the plurality of components is to be actuated, selectively varying the stored actuating times of selected components while said machine is operating to thereby change the relative times in each machine cycle when said selected machine components are to be actuated, comparing the digital signal corresponding to the time elapsed in each cycle with the stored relative component actuating times, generating an actuating signal when a favorable comparison results, and providing in response to said actuating signal a component operating command to the component whose component actuating time compared with the cycle time elapsed.

15. The method of claim 14 further comprising the step of initiating a machine starting or stopping sequence at any time during a machine cycle, said machine starting and stopping sequences being preselected to inhibit and enable machine components in a desired sequence.

16. The method of claim 15 further comprising the step of controlling a plurality of machines wherein each of said machines operates in a preselected interdependent timed relationship with respect to one another.

17. The method of claim 14 wherein said selectively varying the component actuating times step comprises the steps of:

presetting an up-down counter to the cycle actuating time of the selected machine component, energizing said up-down counter to selectively count up or down, and reading the count of said up-down counter into said sequence storage means when the desired cycle time for component actuation is reached.

18. The method of claim 17 wherein said selectively varying the component actuating times step further comprises the steps of:

detecting when the count of said up-down counter reaches 360 when counting up, detecting when the count of said up-down counter reaches 999 when counting down, coupling the count of 000 to the jam input of said up-down counter when counting up, coupling the count of 359 into the jam input of said up-down counter when counting down, presetting said up-down counter to the count of 0 when the counter reaches the count of 360 when counting up, and presetting the up-down counter to the count of 359 when the count of said up-down counter reaches 999 when counting down.

19. The method of claim 18 wherein said step for initiating a machine starting or stopping sequence comprises the steps of:

storing the addresses of each of the machine components to be enabled during the starting or stopping sequence, comparing the address stored with the address in an addressing means when the cycle time elapsed corresponds to the time a component is to be enabled or inhibited, enabling a selected one of a plurality of random access memory units when a compare is made, and reading out the machine actuating comments stored in the random access memory units in sequence, the commands controlling the operation of the machine component.

20. In a glassware forming machine having a plurality of sections, each of which includes a plurality of movable components which operate in timed relationship with respect to one another, means for feeding gobs of molten glass at a uniform rate from a predetermined location to each of said sections, said sections forming rigid glassware articles from the gobs taken from said feeding means, wherein said movable components are each actuated at respective relative times in each of a plurality of machine cycles, and said machine including machine cycle position indicating means for cyclically moving in synchronism with the cyclic operation of said machine, said controller comprising:

timing means responsive to said machine cycle position indicating means for generating a digital signal in synchronism with the movement of said cycle position indicating means, said digital signal providing an instantaneous indication of the time elapsed in each cycle of operation of said machine, a storage means for storing the sequential relative times in a cycle of machine operation when each of the plurality of components is to be actuated, means coupled to said storage means for selectively varying the actuating times of selected components stored in said storage means while said machine is operating to thereby change the relative times in each machine cycle when said selected machine components are to be actuated, means for cyclically reading out the contents of said storage means, comparator means responsive to said timing means and said readout means for comparing the time elapsed in each cycle with the relative component actuating times stored in said storage means, said comparator providing an actuating signal when a favorable comparison results, and addressing means receiving said actuating signal from said comparator means for providing a component operating command to the component whose component actuating time compared with the cycle time elapsed.

21. In a glassware forming machine having a plurality of sections each of which includes a plurality of movable components which operate in timed relationship with respect to one another, means for feeding gobs of molten glass at a uniform rate from a predetermined location to each of said sections, said sections forming rigid glassware articles from the gobs taken from said feeding means, wherein said movable components are each actuated at respective relative times in each of a plurality of machine cycles, and a machine cycle position indicating means for cyclically moving in synchronism with the cyclic operation of said machine, said controller comprising:

timing means responsive to said machine cycle position indicating means for generating digital signals in synchronism with the movement of said cycle position indicating means, said digital signals providing an instantaneous indication of the time elapsed in each cycle of operation of said machine, a storage means for storing the sequential relative times in a cycle of machine operation when each of the plurality of components is to be actuated, means coupled to said storage means for selectively varying the actuating times of selected components stored in said storage means while said machine is operating to thereby change the relative times in each machine cycle when said selected machine components are to be actuated, means for cyclically reading out the contents of said storage means, comparator means responsive to said timing means and said readout means for comparing the time elapsed in each cycle with the relative component actuating times stored in said storage means, said comparator providing an actuating signal when a favorable comparison results, addressing means receiving said actuating signal from said comparator means for providing a component operating command to the component whose component actuating time compared with the cycle time elapsed, and means for simultaneously controlling a plurality of machine sections wherein each of said machine sections operates in a preselected interdependent timed relationship with respect to one another.

22. In a glassware forming machine having a plurality of sections each of which includes a plurality of movable components which operate in timed relationship with respect to one another, means for feeding gobs of molten glass at a uniform rate from a predetermined location to each of said sections, said sections forming rigid glassware articles from the gobs taken from said feeding means, wherein said movable components are each actuated at respective relative times in each of a plurality of machine cycles, and machine cycle position indicating means for cyclically moving in synchronism with the cyclic operation of said machine, a programmable automatic controller for controlling said machine comprising generating a digital signal in synchronism with the movement of said cycle position indicating means, said digital signal providing an instantaneous indication of the time elapsed in each cycle of operation of said machine, storing the sequential relative times in a cycle of machine operation when each of the plurality of components is to be actuated, selectively varying the stored actuating times of selected components while said machine is operating to thereby change the relative times in each machine cycle when said selected machine components are to be actuated, comparing the time elapsed in each cycle with the stored relative component actuating times, generating an actuating signal when a favorable comparison results, and generating in response to said actuating signal a component operating command to the component whose component actuating time compared with the cycle time elapsed.

* * * * *

UNITED STATES PATENT OFFICE
CERTIFICATE OF CORRECTION

Patent No. __3,969,703__   Dated __July 13, 1976__

Inventor(s) __Jerome A. Kwiatkowski & Charles L. Wood__

It is certified that error appears in the above-identified patent and that said Letters Patent are hereby corrected as shown below:

Column 5, line 44:  -- sooner or later -- should be -- "sooner" or "later"

Column 5, line 46:  -- sooner or the later -- should be -- "sooner" or the "later"

Column 5, line 52:  -- whch -- should be -- which

Column 5, line 55:  -- ande -- should be -- and

Column 5, line 61:  -- drive -- should be -- driver

Column 5, line 68:  --startstop -- should be -- start-stop

Column 6, line 45:  -- pules -- should be -- pulse

Column 7, line 13:  -- storbe -- should be -- strobe

Column 7, line 31:  -- order -- should be -- other

Column 8, lines 38/39:  --registers memory -- should be -- registers comprising memory Column 8, line 42:  -- setreset -- should be -- set-reset Column 9, line 50:  -- number 0 -- should be -- numbered 0

Column 10, line 34:  -- couner -- should be -- counter

Column 10, lines 42/43:  -- one pulse -- should be -- one-pulse

Column 11, line 43:  -- sooner and later -- should be -- "sooner" and "later"

Column 11, line 64:  -- sooner and later -- should be -- "sooner" and "later"

UNITED STATES PATENT OFFICE
CERTIFICATE OF CORRECTION

Patent No. 3,969,703  Dated  July 13, 1976

Inventor(s) - Kwiatkowski & Wood

It is certified that error appears in the above-identified patent and that said Letters Patent are hereby corrected as shown below:

Column 11, line 66: -- sooner or later -- should be -- "sooner" or "later"

Column 12, line 7: -- later -- should be -- "later"

Column 12, line 10: -- sooner -- should be -- "sooner"

Column 12, line 16: -- sooner -- should be -- "sooner"

Column 12, line 22: -- counter 359 -- should be -- counter to 359

Column 12, line 25: -- sooner -- should be -- "sooner"

Column 12, line 29: -- "latter" -- should be -- "later"

Column 12, line 53: -- sooner -- should be -- "sooner"

Column 12, line 64: -- sooner or later -- should be -- "sooner" or "later"

Column 13, line 2: -- sooner -- should be -- "sooner"

Column 13, line 11: -- sooner -- should be -- "sooner"

Column 13, line 19: -- sooner or later -- should be -- "sooner" or "later"

Column 14, line 3: -- sooner or later -- should be -- "sooner" or "later"

UNITED STATES PATENT OFFICE
CERTIFICATE OF CORRECTION

Patent No. 3,969,703            Dated July 13, 1976

Inventor(s) Jerome A. Kwiatkowski & Charles L. Wood

It is certified that error appears in the above-identified patent and that said Letters Patent are hereby corrected as shown below:

Column 14, line 8, -- sooner or later -- should be "sooner" or "later"

Signed and Sealed this

Twentieth Day of September 1977

[SEAL]

Attest:

RUTH C. MASON          LUTRELLE F. PARKER
*Attesting Officer*        *Acting Commissioner of Patents and Trademarks*